United States Patent [19]
Hoebel

[11] Patent Number: 4,824,264
[45] Date of Patent: Apr. 25, 1989

[54] BEARING OF AN AXLE DRIVE BEVEL PINION

[75] Inventor: Peter Hoebel, Wiernsheim-Serres, Fed. Rep. of Germany

[73] Assignee: Dr. Ing. h.c.F. Porsche Aktiengesellschaft, Stuttgart, Fed. Rep. of Germany

[21] Appl. No.: 156,605

[22] Filed: Feb. 17, 1988

[30] Foreign Application Priority Data

Feb. 21, 1987 [DE] Fed. Rep. of Germany ....... 3705607

[51] Int. Cl.$^4$ .................. F16C 33/66; F16C 33/36; F16H 57/04
[52] U.S. Cl. .................................. 384/473; 74/467; 384/475; 384/571
[58] Field of Search ............... 384/322, 397, 400, 401, 384/403, 404, 407, 462, 465, 472-475, 569, 571; 74/467, 417

[56] References Cited

U.S. PATENT DOCUMENTS

| | | | |
|---|---|---|---|
| 2,019,464 | 10/1935 | Riblet | 384/571 X |
| 4,319,499 | 3/1982 | Sanui et al. | 74/467 X |
| 4,480,493 | 11/1984 | Takahashi | 74/467 |
| 4,729,252 | 3/1988 | Hüber et al. | 74/417 |

Primary Examiner—Thomas R. Hannon
Attorney, Agent, or Firm—Barnes & Thornburg

[57] ABSTRACT

A pinion shaft of an axle drive bevel pinion mating with a bevel gear is disposed in two tapered roller bearings, the joint outer race of which is flanged onto the axle housing. In order to lubricate the tapered roller bearings with splash oil and avoid dirt deposits in the bearing area, the outer race of the tapered roller bearings has an oil feeding duct to a collecting pipe arranged above, and at its underside, an oil return duct to the transmission oil sump.

10 Claims, 2 Drawing Sheets

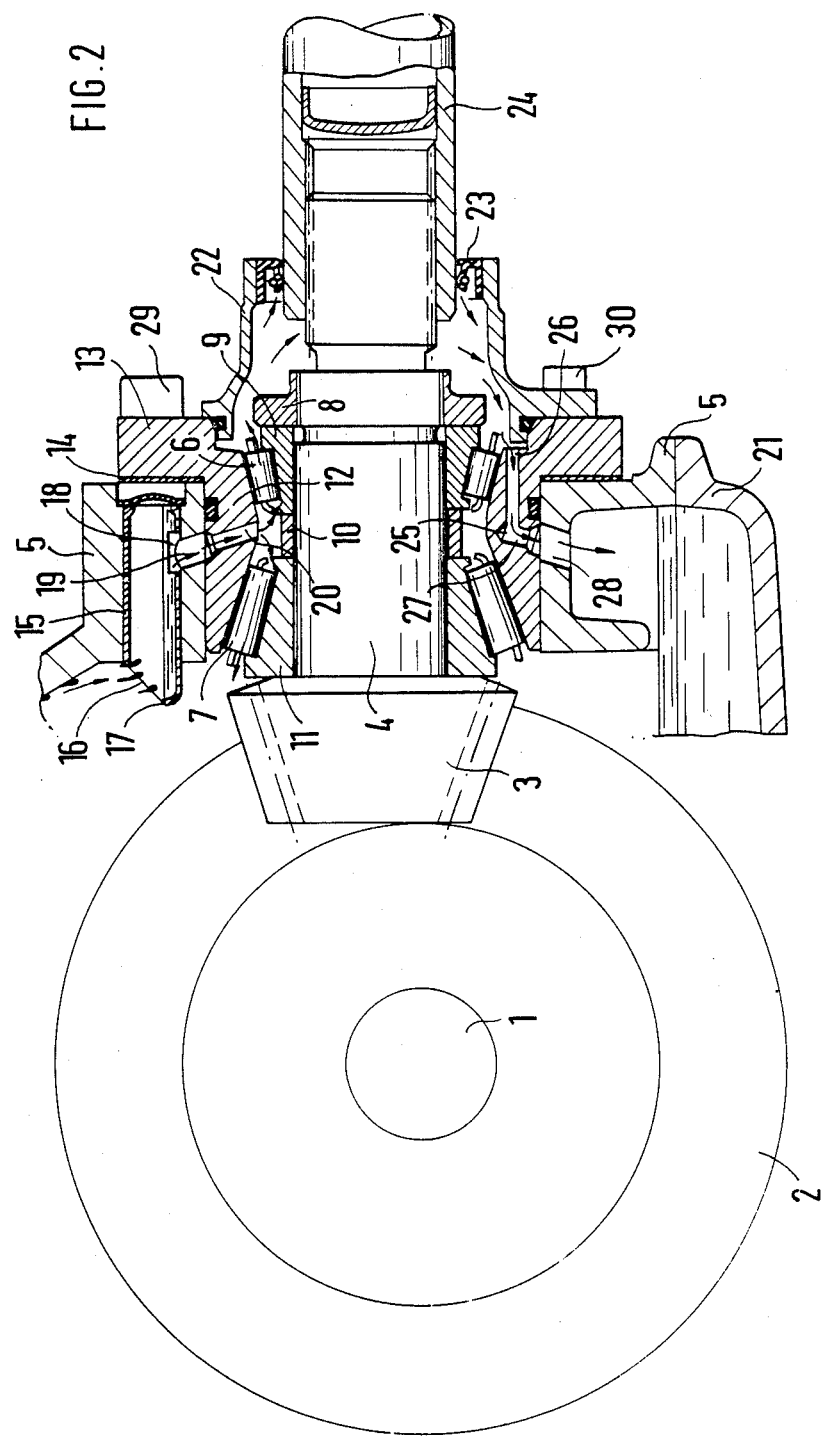

BEARING OF AN AXLE DRIVE BEVEL PINION

BACKGROUND AND SUMMARY OF THE INVENTION

The invention relates to the bearing and lubrication of an axle drive bevel pinion of a motor vehicle having at least two tapered roller bearings that are lubricated, via an oil feeding duct arranged between the bearings, by splash oil that is collected in a collecting receptacle located above the roller bearings.

This general type of bearing is known from U.S. Pat. No. 4,319,499. In order to be able to feed a sufficient amount of splash oil to the tapered roller bearings, the bearing lug receiving them, at its exterior surface on top, is designed as a collecting bowl for splash oil. From there, an oil duct extends downward and ends in the center between the two tapered roller bearings. It is a disadvantage in this case that possible impurities and dirt particles of the splash oil cannot flow off out of the bearing area and can accumulate at the tapered roller bearings.

It is an objective of the present invention to provide a bearing and the lubrication of an axle drive bevel pinion with constructively simple means so that a continuous oil flow through the bearing is ensured.

This and other objects are achieved in the present invention by providing a bearing having two tapered roller bearings that are lubricated by splash oil from an oil feeding duct between the bearings, with a joint outer race for the roller bearings. A top side of the joint outer race contains the oil feeding duct while a bottom side contains an oil return duct that is connectable with an oil sump.

Because the outer race of the tapered roller bearings at its bottom side has an oil return duct to the transmission oil sump, the splash oil flowing in at the top side of the outer race can continuously flow off below, so that no oil residues collect at the tapered roller bearings. The inflow of oil that takes place as a result of gravity is promoted by the centrifugal force caused at the tapered roller bearings. As the collecting receptacle for the splash oil, a collecting pipe is used that is inserted above the tapered roller bearings into the axle housing. With a downwardly slanted mouthpiece, the pipe projects out of the wall of the axle housing. It receives the splash oil flowing down at the interior wall of the axle housing and guides it through a lower opening to an oil duct in the housing wall that is in alignment with a downward-directed oil feeding duct of the outer race of the tapered roller bearing.

The precise assignment of the housing ducts to the oil ducts of the outer race is ensured by the fact that the outer race is flanged onto the housing. Thus, after the mounting in axial direction and in circumferential direction, the outer race has a fixed position with respect to the housing.

Before the flanging of the outer race to the housing, the bevel pinion with both tapered roller bearings is pre-assembled in the outer race. The inner races of the tapered roller bearings are prestressed with respect to the bevel pinion by means of a nut screwed onto the pinion shaft, and the tapered rollers, while the radial play is eliminated, are placed against the inner running surfaces of the outer race. This compact structural unit is inserted into the housing. The gear clearance of the bevel pinion with respect to the bevel gear can be adjusted by an adjusting disk having a certain disk thickness that is inserted between the housing and the flange of the outer race.

Other objects, advantages and novel features of the present invention will become apparent from the following detailed description of the invention when considered in conjunction with the accompanying drawings.

BRIEF DESCRIPTION OF THE DRAWINGS

FIG. 2 is a longitudinal sectional view through the bearing of the bevel pinion taken along Lines II—II of FIG. 1.

DETAILED DESCRIPTION OF THE DRAWINGS

Figure 1:
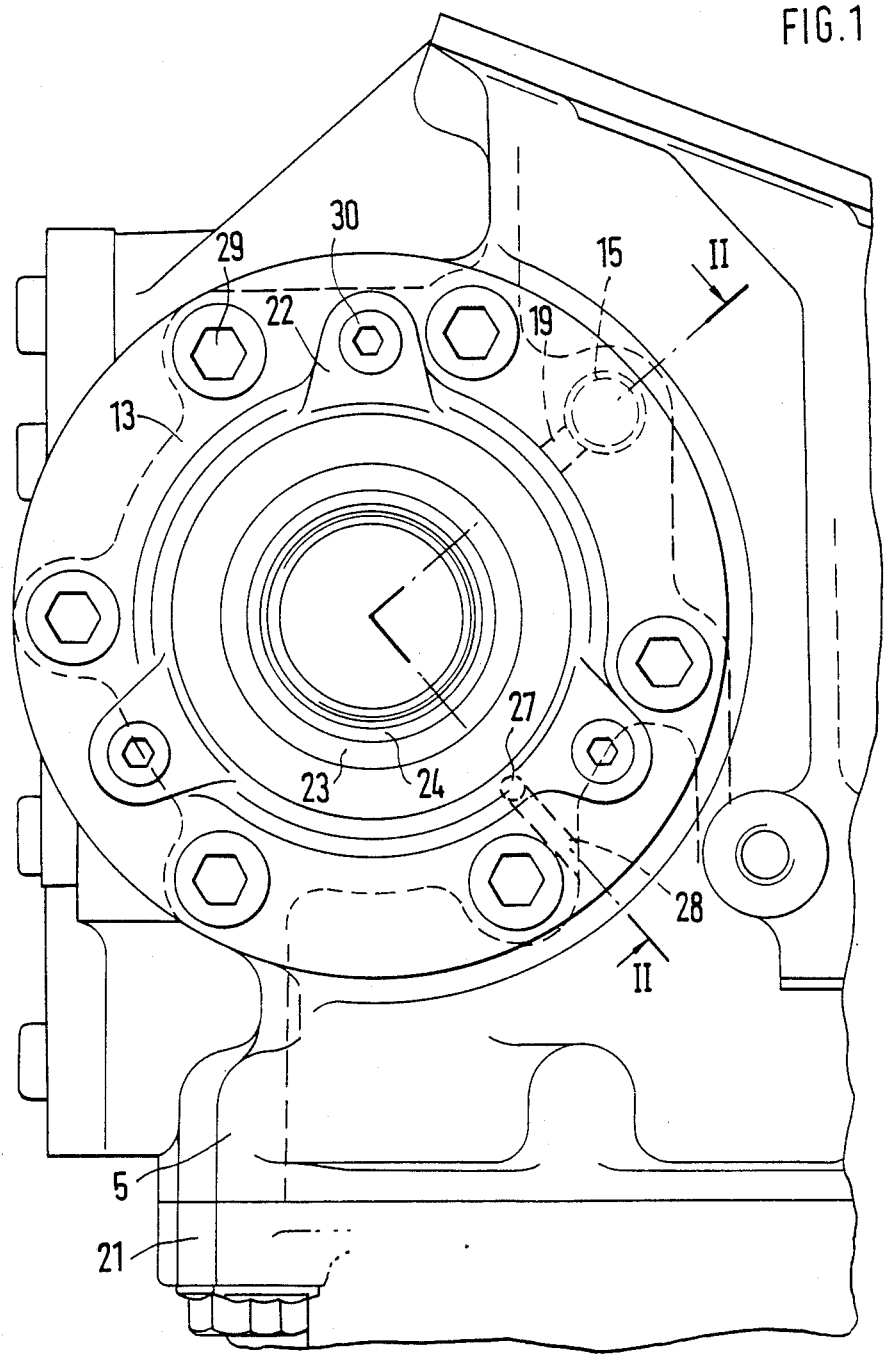
FIG. 1 is a schematic front view of an axle transmission housing.

As seen in FIG. 2, the axle drive of a motor vehicle includes an axle drive bevel gear 2 mounted on a vehicle axle 1 and a bevel pinion 3 that mates with it. The pinion shaft 4 of the bevel pinion 3, in longitudinal direction of the vehicle, is borne in an axle housing 5 in tapered roller bearings 6 and 7. A nut 8 screwed onto the pinion shaft 4 braces with respect to the bevel pinion 3, an inner race 9 of the tapered roller bearing 6, a spacer 10 and an inner race 11 of the tapered roller bearing 7. At the same time, in this embodiment, the tapered rollers of the tapered roller bearings 6 and 7 are placed against conical inner running surfaces of an outer race 12 that both tapered roller bearings 6 and 7 have in common. The complete, pre-assembled connected unit consisting of the pinion shaft 4, tapered roller bearings 6 and 7 as well as the outer race 12 is inserted into a fitted bore of the axle housing 5 in this manner. A flange 13 of the outer race 12 flanges this connection unit to the axle housing 5, the seat diameter of the outer race 12 in the axle housing 5 being larger than the largest diameter of the bevel pinion 3.

Between the axle housing 5 and the flange 13, an adjusting disk 14 is inserted that has a disk thickness such that an optimal flank clearance is obtained at the toothing of the bevel pinion 3 - bevel gear 2.

Above the tapered roller bearings 6 and 7, a collecting pipe 15 for splash oil that is parallel to the pinion shaft is pressed into a housing bore that is parallel with the pinion shaft 4. By means of a mouthpiece 16 that projects out of the wall of the axle housing 5 and that on its underside has a collecting groove 17 that is bent upward, splash oil is collected. The splash oil is fed via an opening 18 to a housing bore 19 that is in alignment with an oil feeding duct 20 that is bored into the top side of the outer race 12. The oil feeding duct 20 ends in the center between the tapered roller bearings 6 and 7. One part of the splash oil flows to the larger tapered roller bearing 7 on the side of the pinion and is transported by it to the transmission oil sump 21. The other part of the splash oil flows through the smaller tapered roller bearing 6, collects in the lower area of the outer race 12 and in the sealing shell 22 flanged onto it. The lip seal 23 of the sealing shell has a sealing effect with respect to a coupling sleeve 24 fastened on the pinion shaft 4.

On the underside, the outer race 12 contains an oil return duct 25 that includes a segment 26 extending in parallel to the pinion shaft 4 and of a connecting segment 27 extending radially with respect to the outer race 12. This radially extending segment 27 is in alignment with a lower housing bore 28. The splash oil returns to the transmission oil sump 21 via the oil return duct 25. The flange 13 of the outer race 12 is fastened at the axle housing by screws 29 and the sealing shell 22 is fastened at the flange 13 by screws 30.

The oil return duct 25 is mounted at the outer race 12 at such a height that an oil level is obtained that continuously lubricates the lower tapered rollers, and dirt particles are continuously washed away through it and transported into the oil sump 21.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A bearing arrangement of an axle drive bevel pinion of a motor vehicle, having two tapered roller bearing means that are lubricated via an oil feeding duct arranged between said bearing means, by splash oil that is collected in a collecting receptacle located above said tapered roller bearing means, comprising joint outer race means for said two roller bearing means, a top side of said joint outer race means containing said oil feeding duct and a bottom side of said joint outer race means containing an oil return duct which is spaced from said tapered roller bearing means and connectable with a transmission oil sump.

2. A bearing arrangement according to claim 1, further comprising an axle housing having a bore disposed above said roller bearing means, and a collecting pipe for splash oil inserted in said bore, said collecting pipe being connected with said oil feeding duct.

3. A bearing arrangement according to claim 2, further comprising a bevel pinion having a pinion shaft supported by said roller bearing means, wherein said collecting pipe extends parallel to said pinion shaft.

4. A bearing arrangement according to claim 3, wherein said collecting pipe has a slanted mouthpiece that projects out of a wall of said axle housing, said mouthpiece extending in downward direction and having a bottom side which is bent upward.

5. A bearing arrangement according to claim 1, wherein said oil return duct includes a first segment that extends in parallel to said pinion shaft, and a second segment that connects to said first segment and extends approximately radially to said joint outer race means, and wherein said axle housing includes an aligned bore for connecting said second segment to said transmission oil sump.

6. A bearing arrangement according to claim 1, further comprising an axle housing surrounding the outer race means and a bevel pinion having a pinion shaft supported by said roller bearing means, wherein a seat diameter of said joint outer race means in axle housing is larger than a largest diameter of a bevel pinion.

7. A bearing arrangement according to claim 6, wherein said joint outer race means is flanged to said axle housing and further comprising inner race means for said tapered roller bearing means, said inner race means being braced axially with respect to said bevel pinion by nut means screwed onto said pinion shaft, such that said tapered roller bearing means are placed against running surfaces of said joint outer race means without play.

8. A bearing arrangement according to claim 1, wherein said oil feeding duct extends axially with respect to the axle drive bevel pinion.

9. A bearing arrangement of an axle drive bevel pinion of a motor vehicle, having two tapered roller bearing means that are lubricated via an oil feeding duct arranged between said bearing means, by splash oil that is collected in a collecting receptacle located above said tapered roller bearing means, comprising:

joint outer race means for said two roller bearing means, a top side of said joint outer race means containing said oil feeding duct and a bottom side of said joint outer race means containing an oil return duct which is connectable with a transmission oil sump;

axle housing having a bore disposed above said roller bearing means, and a collecting pipe for splash oil inserted in said bore, said collecting pipe being connected with said oil feeding duct;

bevel pinion having a pinion shaft supported by said roller bearing means, wherein said collecting pipe extends parallel to said pinion shaft; and said collecting pipe has a slanted mouthpiece that projects out of a wall of said axle housing, said mouthpiece extending in downward direction and having a bottom side which is bent upward.

10. A bearing arrangement of an axle drive bevel position of a motor vehicle, having two tapered roller bearing means that are lubricated via an oil feeding duct arranged between said bearing means, by splash oil that is collected in a collecting receptacle located above said tapered roller bearing means, comprising:

joint outer race means for said two roller bearing means, a top side of said joint outer race means containing said oil feeding duct and a bottom side of said joint outer race means containing an oil return duct which is connectable with a transmission oil sump; and said oil return duct includes a first segment that extends in parallel to said pinion shaft, and a second segment that connects to said first segment and extends approximately radially to said joint outer race means, and wherein said axle housing includes an aligned bore for connecting said second segment to said transmission oil sump.

* * * * *